United States Patent
Patel et al.

(10) Patent No.: US 6,308,788 B1
(45) Date of Patent: *Oct. 30, 2001

(54) CONDUCTIVE MEDIUM FOR OPENHOLE LOGGING AND LOGGING WHILE DRILLING

(75) Inventors: Arvind D. Patel; Rejinald J. Bell; Burhan Hoxha, all of Houston, TX (US)

(73) Assignee: M-I LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/514,680

(22) Filed: Feb. 28, 2000

Related U.S. Application Data

(63) Continuation-in-part of application No. 09/021,013, filed on Feb. 9, 1998, now Pat. No. 6,029,755, which is a continuation-in-part of application No. 09/013,454, filed on Jan. 26, 1998, now Pat. No. 5,990,050, which is a continuation-in-part of application No. 09/004,267, filed on Jan. 8, 1998, now abandoned.

(51) Int. Cl.[7] ............................. C09K 7/06; E21B 21/00; E21B 49/00
(52) U.S. Cl. ................... 175/50; 73/152.03; 166/254.2; 507/103; 507/129; 507/131
(58) Field of Search ............................. 175/50, 65, 66; 166/254.2; 507/103; 73/152.03

(56) References Cited

U.S. PATENT DOCUMENTS

| | | | |
|---|---|---|---|
| H1611 | 11/1996 | Patel | 507/103 |
| 3,899,431 | * 8/1975 | Hayes et al. | 507/135 |
| 4,012,329 | 3/1977 | Hayes et al. . | |

(List continued on next page.)

FOREIGN PATENT DOCUMENTS

| | | |
|---|---|---|
| 0 374671 A1 | 6/1990 | (EP) . |
| 3842703 | 6/1990 | (DE) . |
| 0 449257 A2 | 2/1991 | (EP) . |
| 0 495579 A3 | 7/1992 | (EP) . |
| 0 652271 A1 | 5/1995 | (EP) . |
| 0 730018 A1 | 1/1996 | (EP) . |
| 0 902076 A2 | 2/1998 | (EP) . |
| 751191 | 6/1956 | (GB) . |
| 2 223255 A | 4/1990 | (GB) . |
| 2 251447 A | 8/1992 | (GB) . |
| 2 252993 A | 8/1992 | (GB) . |
| 2 283036 A | 4/1995 | (GB) . |
| WO 89/01491 | 2/1990 | (WO) . |
| WO 90/06980 | 6/1990 | (WO) . |
| WO 90/06981 | 6/1990 | (WO) . |
| WO 92/14798 | 9/1992 | (WO) . |
| WO 9316145 | 8/1993 | (WO) . |
| WO 9323491 | 11/1993 | (WO) . |
| WO 9416030 | 7/1994 | (WO) . |
| WO 9619545 | 6/1996 | (WO) . |
| WO 97/10313 | 3/1997 | (WO) . |

OTHER PUBLICATIONS

Akzo Nobel Chemicals Inc.; Material Safety Data Sheet, Aug. 28, 1997.
Akzo Nobel Chemicals Inc.; Material Safety Data Sheet, Jun. 11, 1998.
Special Products, Div. of Champion Technologies, Inc.; Certificate of Analysis for M–I Drilling Fluids, Dec. 16, 1997.
M–I L.L.C.; Transportation & Material Safety Data Sheet (EMI–523), Jun. 26, 1997.
M–I L.L.C.; Material Safety Data Sheet (EMI–524 A), Oct. 24, 1997.
Akzo Nobel Chemicals Inc.; Catalog "*Surface Chemistry/Industrial Surfactants/Nitrogen Derivatives*," pp. 1–39, Pub. 36–100 (1996).
Tomah Products, Inc.; Formulary and Application Guide.
Dickey, Parke A.; Petroleum Development Geology, 2nd Ed.; Penn Well Books before 1988, pp. 57–83.
The Dow Chemical Company; Physical Properties of Dowanol Glycol Ethers and Acetates; table; Jun. 1995.
The Dow Chemical Company; Material Safety Data Sheet, Oct. 20, 1997.

(List continued on next page.)

*Primary Examiner*—George Suchfield
(74) *Attorney, Agent, or Firm*—Howrey Simon Arnold & White LLP; Stephen H. Cagle; Carter J. White

(57) ABSTRACT

A method of electrically logging subterranean wells using a conductive fluid in which the conductive fluid includes a miscible combination of an oleaginous fluid, a polar organic solvent, and an electrolytic salt. The electrolytic salt or brine of the salt is present in a concentration sufficient to permit the electrical logging of the subterranean well. The medium may further include gelling agent, weight material, surfactant, or corrosion inhibitors. The polar organic solvent may preferably be a oil soluble glycol or glycol ether such as ethylene glycol, diethylene glycol, propylene glycol, polypropylene glycol, and the like. The electrolytic salt or brine is preferably a quaternary amine salt having the formula:

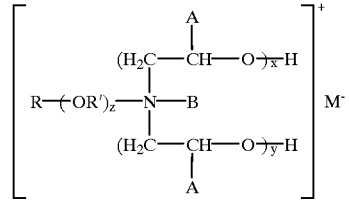

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, $x+y=1$ to 15, z is 0 to 3, and $M^-$ is a counter anion; or combinations thereof.

25 Claims, No Drawings

U.S. PATENT DOCUMENTS

| | | |
|---|---|---|
| 4,508,628 | 4/1985 | Walker et al. . |
| 4,647,859 * | 3/1987 | Son et al. .......................... 507/103 X |
| 4,747,969 | 5/1988 | Rupilius et al. . |
| 4,830,765 | 5/1989 | Perricone et al. . |
| 4,941,981 | 7/1990 | Perricone et al. . |
| 4,950,995 * | 8/1990 | Falk ............................ 166/250.17 X |
| 4,963,273 | 10/1990 | Perricone et al. . |
| 4,964,615 | 10/1990 | Mueller et al. . |
| 5,057,234 | 10/1991 | Bland et al. . |
| 5,072,794 | 12/1991 | Hale et al. .............................. 175/50 |
| 5,120,708 | 6/1992 | Melear et al. ........................ 507/126 |
| 5,141,920 * | 8/1992 | Bland et al. .......................... 507/136 |
| 5,348,938 | 9/1994 | Mueller et al. ....................... 507/139 |
| 5,628,833 * | 5/1997 | McCormack et al. ................. 134/26 |
| 5,909,779 * | 6/1999 | Patel et al. ............................. 175/50 |
| 5,990,050 * | 11/1999 | Patel ...................................... 507/136 |
| 6,029,755 * | 2/2000 | Patel ....................................... 175/50 |
| 6,100,222 * | 8/2000 | Vollmer et al. .................. 507/103 X |

OTHER PUBLICATIONS

The Dow Chemical Company; Product Information—Dowanol DPNB, Apr. 1997.

The Dow Chemcial Company; Product Information—Dowanol PNB, Apr. 1997.

The Dow Chemcial Company; The Glycol Ethers Handbook, Oct. 1993.

Chemical Abstract Services Search Report, Oct. 27, 1997.

Hampel, Clifford A. et al, Glossary of Chemical Terms, Second Edition, Van Nostrand Reinhold Company Inc., 1982, pp. 9 and 10.*

* cited by examiner

CONDUCTIVE MEDIUM FOR OPENHOLE LOGGING AND LOGGING WHILE DRILLING

CROSS REFERENCES TO RELATED APPLICATIONS

This is a continuation-in-part of application Ser. No. 09/021,013, now U.S. Pat. No. 6,029,755, filed on Feb. 9, 1998; which is a continuation-in-part of application Ser. No. 09/013,454, now U.S. Pat. No. 5,990,050, filed Jan. 26, 1998; which is a continuation-in-part of application Ser. No. 09/004,267, now abandoned, filed on Jan. 8, 1998 now abandoned.

BACKGROUND OF THE INVENTION

1. Field of the Invention

The present invention is generally directed to a conductive fluid medium useful in the openhole wireline logging of subterranean wells and in logging-while-drilling. Further, the present invention is directed to a method of using this medium in electrical wireline logging of oil and gas wells and logging while drilling.

2. Description of the Related Art

The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formations penetrated by the well in addition to other important properties of the well. Electrical logs and other wireline log techniques are depended upon in the oil and gas exploration industry to determine the nature of the geology and the reservoir properties of the petroleum bearing formations penetrated by the well. Further, wireline well logs are often the only record of the formations penetrated by the well available for correlation amongst different wells in a particular field.

When an electrical wireline log is made of a well, electrodes on the well logging tool are in contact with wellbore fluid or filter cake and hence the formation rocks through which the well has penetrated. An electrical circuit is created and the resistance and other electrical properties of the circuit may be measured while the logging tool is retracted from the well. The resulting data is a measure of the electrical properties of the drilled formations verses the depth of the well. Another common measurement made with an electrical log, besides resistivity, is the spontaneous or self potential. One of skill in the art of well logging and electrical logging in particular should understand how to interpret the results of such measurements to determine the presence or absence of petroleum or gas, the porosity of the formation rock and other important properties of the well. Further information in this regard can be found in the book entitled "Essentials of Modern Open-hole Log Interpretation" by John T. Dewan the contents of which are hereby incorporated herein by reference, and other similar reference material.

An alternative or supplement to wireline logging involves logging tools placed in specialized drill collar housing and run in the drill string near the bit. This technique is known as logging-while-drilling (LWD) or formation-evaluation-while-drilling (FEWD). Measurements such as electrical resistivity can be thereby taken and stored down hole for later retrieval during a "tripping out" of the drill string, or transmitted to the surface via mud-pulse telemetry. Such techniques should be known to one of skill in the art of well drilling and subterranean well logging.

The use of oil-based muds and drilling fluids has become increasingly popular since their introduction of the technology in the 1950's. Innovations in oil-based muds and drilling fluids are of on-going importance with the development of environmentally friendly drilling fluids and fluids having other special characteristics. Oil-based muds offer advantages over water-based muds in many drilling situations. In particular, oil-based muds are known in the art to provide excellent shale inhibition, borehole stability, lubricity, thermal stability, tolerance of contamination and ease of maintenance. Despite the many benefits of utilizing oil-based muds and drilling fluids, they have disadvantages. One such disadvantage addressed by the present invention is that normal resistivity and self potential measurements cannot be taken when the well has been drilled with a conventional oil-based mud or drilling fluid due to the non-conductive nature of the oil-based drilling fluids and muds. Of the many attempts to date, none have met with much success or commercial acceptance in the subterranean well drilling art. Thus there exists an on-going need and desire for drilling fluids and drilling muds that are oil-based and yet allow the taking of wireline electrical logs of the well and electrical-logging-while-drilling.

BRIEF SUMMARY OF THE INVENTION

The present invention is generally directed to providing an oil-base medium suitable for electrically logging a subterranean well. The medium in its continuous phase includes an oleaginous fluid, a polar organic solvent and an electrolytic salt. The continuous phase is in contact with the logging tool and the wellbore of the well. The continuous phase may have dispersed within it fluid droplets or solid particles immiscible with the continuous phase. The oleaginous fluid may be a diesel, mineral oil, vegetable oil, synthetic oil, silicone oil, or combinations of these fluids. The polar organic solvent should be at least partially soluble in the oleaginous fluid, but should also have partial solubility in water. Examples of such polar solvents may include ethylene glycol, diethylene glycol, propylene glycol, polyethylene glycol, polypropylene glycol, and their alkyl ether derivatives. The electrolytic salt or brine should be selected so that it is at least partially soluble in the mixture of oleaginous fluid and polar organic solvent. Suitable salts or brines may include magnesium chloride, sodium chloride, sodium bromide, potassium chloride, ammonium chloride, calcium chloride, calcium bromide, organic salts or combinations thereof. Organic salts may include salts such as sodium acetate, potassium acetate, sodium citrate, quaternary amine salts or combinations thereof may be used. A quaternary amine salt is preferably utilized in place of or in addition with the aforementioned electrolytic salts. Preferably such quaternary amine salts have the formula:

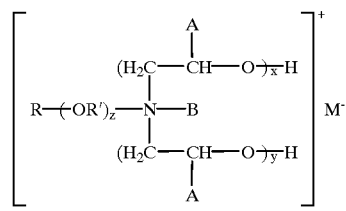

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M– is a counter anion; or combinations thereof. In one preferred embodiment, the electrolytic salt is a quaternary amine salt, having the formula:

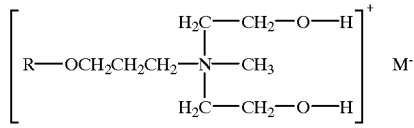

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride, sold under the tradename Q-17-2PG by Tomah Product Inc. of Milton, Wis. USA. The counter-anion to the quaternary amine cation may be the conjugate base of any mineral acid or strong organic acid. Preferably the counter-anion is a halide ion, nitrate ion, sulfate ion, acetate ion, alkyl sulfonate ion, haloalkylsulfonate ion, or the like.

The logging medium may also include viscosifier or gelling agent, such as clays, organophilic clays, polymers, polyamides, polymer emulsions or combinations thereof and the like. In addition, the logging medium of the present invention may have suspended within it a weight material such as hematite, magnetite, iron oxides, illmenite, barite, siderite, celestite, dolomite, calcite, manganese oxides, halites or combinations of these. The continuous phase of the logging medium comprises the oleaginous fluid together with the polar organic solvent, salt, brine or other materials that may be dissolved therein. These other materials may include corrosion inhibitors, emulsifiers or fluid loss additives.

Another embodiment of the present invention, includes drilling a subterranean well with the fluid of the present invention serving as the medium for logging-while-drilling via a suitable tool in the drill string. Another embodiment includes drilling the subterranean well with a drilling fluid in which the logging medium of the present invention is a component. In such an embodiment, the logging medium should be in sufficient concentration so as to enable one to make electrical log measurements of the subterranean well.

The present invention is also directed to a process whereby electric logging is carried out in a wellbore containing the fluid medium described herein. The electrical logging may be by wireline logging methods or by logging while drilling techniques known to the art. The composition of the medium includes an oleaginous fluid, a polar organic solvent and an electrolytic salt. In addition, the medium may include gelling agent and weight material, and optionally a corrosion inhibitor. Alternatively, the medium may also include surfactant, emulsifier, wetting agent, fluid loss control agent or combinations of these in addition to the components previously disclosed above.

DETAILED DESCRIPTION OF THE INVENTION

The following terms and phrases are used herein and are intended to have the following meaning:

"medium" or "logging medium" or "fluid medium" mean any fluid or liquid medium which is sufficiently conductive to allow the wireline electrical logging or logging while drilling of a subterranean well;

"oleaginous fluid" is a fluid which has the nature or qualities of oil and is miscible with oil at 20° C.;

"nonoleaginous fluid" is a fluid which is not miscible with oil at 20° C.;

"Polar organic solvent" is a mono- or poly-functional alcohol (i.e. mono-hydric alcohol, di-hydric alcohol or polyhydric alcohol, polyglycol, glycol and poly glycol ethers, etc.) which is at least partially soluble in oleaginous fluid.

"water soluble glycol" is a glycol or glycol ether which is miscible with fresh water at 20° C.;

"preferentially-oil-soluble glycol" is a glycol or glycol ether which at 20° C. is: 1) miscible at all proportions with oil, specifically with ISOPAR-M, but 2) has limited miscibility with water, specifically less than 10% by volume of the glycol ether is miscible in fresh water, that is to say the addition of greater than 10% by volume of the glycol ether mixed with fresh water results in two phases. ISOPAR-M is an isoparaffinic hydrocarbon mineral oil supplied by Exxon Chemical;

"electrolytic salt" is a organic or inorganic salt or brine of such salts that is at least partially soluble or miscible in the logging medium of the present invention and imparts conductivity properties to said medium such that electrical logging can take place;

"conductive medium" is any fluid medium that permits the taking of electrical well logging measurements, and in particular allows the taking of resistivity and self or spontaneous potential measurements of the well.

The present invention is directed to a method of logging a subterranean well and to a well logging medium useful in said method. In one illustrative embodiment, the method includes placing into the subterranean well a logging medium. The logging medium includes an oleaginous fluid, a polar organic solvent and an electrolytic salt, the salt being present in a concentration so as to permit the electrical logging of the well. A second illustrative embodiment of the method of the present invention includes the drilling of a subterranean well with an oleaginous-based logging medium of the present invention. In such an embodiment the oleaginous-based logging medium of the present invention serves as the drilling fluid and enables one to take electrical log measurements of the subterranean well. In yet a third illustrative embodiment, the method includes placing into a subterranean well a fluid medium of the present invention and drilling the subterranean well with a drilling fluid in which the medium of the present invention is at least a component. The medium of the present invention should be present in the continuous phase of the drilling fluid in a concentration such that electrical logging of the well is possible. The use of drilling fluids and or muds in the drilling of a subterranean well should be within the knowledge of one of skill in the art as indicated in commonly available books such as *Petroleum Development Geology*, 3rd Ed. by Parke A. Dickey; *Nontechnical Guide to Petroleum Geology, Exploration, Drilling and Production*, by Norman J. Hyne; both available from PennWell Books and *Composition and Properties of Drilling and Completion Fluids*, 5th Ed. by H. C. H. Darley and George R. Gray available from Gulf Publishing Company, all of the contents of which are hereby incorporated herein by reference.

The logging medium, also referred to herein as simply "medium", useful in the above methods includes a miscible combination of an oleaginous fluid; a polar organic solvent and an electrolytic salt or brine. Such a medium should be sufficiently conductive so as to allow one skilled in the art to take electrical log measurements of the subterranean well.

The medium may further comprise a gelling agent and weight material and optionally included corrosion inhibitor as are discussed below. The medium may further comprise an internal phase which is emulsified in the non-oleaginous conductive medium of this invention, the internal phase includes, non-oleaginous fluids such as aqueous fluids including fresh water, sea water, brine, and other similar fluids utilized for the internal phase of invert emulsion drilling fluids. In this latter case, the drilling medium of the present invention forms an invert emulsion drilling fluid in which the medium forms the external or continuous phase and the non-oleaginous fluid is the internal or non-continuous phase. Another illustrative medium of the present invention may also include components such as surfactant, emulsifier, wetting agent, fluid loss control agent or combinations of these in addition to the previously set forth components.

Suitable oleaginous fluids for use in the medium of present invention include diesel, mineral oil, vegetable oil, synthetic oil, silicone oil, or mixtures of these or similar materials. Examples of vegetable oil include corn oil, soy bean oil, sunflower oil, safflower oil, rapeseed oil, peanut oil, cottonseed oil, rice bran oil, castor bean oil, linseed oil and the like. A synthetic oil may be selected from the group including esters, preferably fatty acid esters, ethers, dialkyl carbonates, acetals or synthetic hydrocarbons which are suitable for such purposes. Examples of such compounds include, olefin derivatives including internal polyolefins, and polyalphaolefins and mixtures of these, linear parafins, monocarboxylic acid esters of $C_2$ to $C_{12}$ alkanol such as those disclosed in U.S. Pat. No. 5,232,910, the contents of which are incorporated herein by reference, dialkyl carbonates in which the alkyl groups have more than 2 carbon atoms, acetals in which the alkoxy groups have more than 2 carbon atoms and the like. Examples of silicone oil that may be used in the formulation of the present invention include dimethylsiloxane polymers, also called dimethyl silicone fluids, such as those described in U.S. Pat. No. 5,707,939 the contents of which are hereby incorporated herein by reference. One of skill in the art should understand and be capable of adjusting the content of the oleaginous fluid content by systematic variation in components so as to achieve the results of the present invention.

The polar organic solvent component of the logging medium of the present invention may be a mono-hydric, di-hydric or poly-hydric alcohol or a mono-hydric, di-hydric or poly-hydric alcohol having poly-functional groups. Examples of such compounds include aliphatic mono-alcohols, (i.e. methanol, ethanol, propanol, etc.), aliphatic diols (i.e. glycols, 1,3-diols, 1,4-diols, etc.), aliphatic poly-ols (i.e. tri-ols, tetra-ols, etc.) polyglycols (i.e. polyethyl-enepropylene glycols, polypropylene glycol, polyethylene glycol, etc.), glycol ethers (i.e. diethylene glycol ether, triethylene glycol ether, polyethylene glycol ether, etc.) and other such similar compounds that may be found useful in the practice of the present invention. Illustrative examples of polar solvents also include propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. In another embodiment dipropylene glycol n-butyl ether or tripropylene glycol n-butyl ether have been preferably used. The present invention may be carried out using a mixture of these above noted glycols. For example, such a mixture may include tripropylene glycol n-butyl ether, tetrapropylene glycol n-butyl ether, pentapropylene glycol n-butyl ether and hexapropylene glycol n-butyl ether herein referred to as polypropylene glycol n-butyl ether (PPNB). An example of such a mixture is commercially available from Shrieve Chemical Co. under the name Drill-Col 545-X which is also referred to herein as PPNB. The use of such fluids in the formulation of drilling fluids and drilling muds is described in greater detail in U.S. Pat. No. 5,990,050 issued Nov. 23, 1999, the contents of which are hereby incorporated herein by reference. Such compounds should be selected so as to be miscible in fresh water at 20° C. and at least partially miscible in the oleaginous fluid component described above. In addition, the polar organic solvent should be capable of at least partially solubilizing the electrolytic salt or brine in the continuous phase of the well logging medium. In another illustrative embodiment, the polar organic solvent may be selected from glycols and glycol ethers of ethylene glycol, diethylene glycol, triethylene glycol, propylene glycol, polypropylene glycol, butylene glycol and mixtures of these. The polar organic solvent may constitute up to about 95% by volume of the well logging medium and preferably is present in an amount from about 1% to about 90% by volume. One of skill in the art should understand and be capable of adjusting the content of the polar organic solvent content so as to achieve the results of the present invention.

The electrolytic salt component of the well logging medium of the present invention is an organic or inorganic salt or brine solution selected so that there is at least partial mutual solubility between the oleaginous liquid, the polar organic solvent and the salt or brine. That is to say, the electrolytic salt should be selected so as to permit the taking of electrical logs of subterranean wells in which the fluid medium of the present invention has been placed. As previously mentioned, the purpose of the electrolytic salt is to impart conductivity to the well logging medium. It should be well known to one of skill in the art that the solubilization of salts in a fluid can impart electrical conductivity to the fluid. However, prior to the present invention, the solubilization of electrolytic salts has not been possible in non-oleaginous based drilling fluids due to the lack of solubility of salts in the continuous phase of such fluids.

In one embodiment of the present invention the electrolytic salt is selected from the alkali and alkaline earth halides and preferably is selected from salts such as sodium chloride, sodium bromide, calcium chloride, calcium bromide, potassium chloride, ammonium chloride, magnesium chloride, organic salts or mixtures and combinations of these. Organic salts may include salts such as sodium acetate, potassium acetate, sodium citrate, quaternary amine salts or combinations thereof may be used. A quaternary amine salt is preferably utilized in place of or in addition with the aforementioned electrolytic salts. Preferably such quaternary amine salts have the formula:

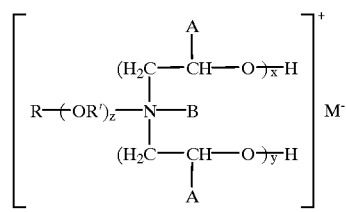

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M⁻ is a counter anion; or combinations thereof. In one preferred embodiment, the electrolytic salt is a quaternary amine, having the formula:

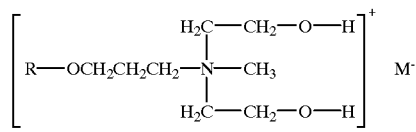

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride, sold under the tradename Q17-2PG by Tomah Product Inc. of Milton, Wis. USA.

The counter anion (M⁻) may be any compatible conjugate base of an acid. Preferably, the conjugate base of a mineral acid or strong organic acid is used. Examples of such mineral acids or strong organic acids include: hydrochloric, hydrobromic and other hydrohalide acids; nitric and nitrous acid; sulfric and sulfurous acid; perchloric acid; acetic acid; halogenated acetic acids such as chloroacetic acid, dicholoroacetic acid, trichloroacetic acid, fluoro acetic acid, difluoroacetic acid, trifluroacetic acid, and the like; organo sulfonates such a methane sulfonic acid, ethane sulfonic acid, benzosulfonic acid, and their halogenated analogs such as chloromethane sulfonic acid, trichloromethane sulfonic acid, trifluoromethane sulfonic acid, perfluorobenzosulfonic acid and the like. The primary factor in selecting a suitable counter-anion is the chemical reactivity, availability and cost, in which case sirnple and inexpensive counter-anions are often preferred such as chloride, nitrate, and sulfonate. Thus the counter-anion to the quaternary amine cation may be the conjugate base of any mineral acid or strong organic acid, preferably the counter-anion is a halide ion, nitrate ion, sulfate ion, acetate ion, alkyl sulfonate ion, haloalkylsulfonate ion, or the like.

The well logging medium of the present invention should have an electrolytic salt concentration that is sufficient to enable the electrical logging of a subterranean well in which the medium is present. That is to say, the electrolytic salt should be present in the oleaginous continuous phase of the logging medium or drilling fluid in an amount to permit electrical logging (i.e. wireline logging) or electrical logging while drilling of the well. One of ordinary skill in the art should understand and be able to adjust the conductivity of the well logging medium of the present invention by selecting or by increasing or decreasing the concentration of the electrolytic salt so as to achieve the results of the present invention.

As previously noted above, the logging medium of the present invention may further contain additives depending upon it's desired end use so long as the additives do not interfere with the properties of the composition described herein. For example, emulsifiers, wetting agents, organophilic clays, viscosifiers, weighting agents, bridging agents, fluid loss control agents, and corrosion inhibitors may be added to the compositions of this invention so as to impart additional functional properties. The addition of such agents should be well known to one of skill in the art of formulating drilling fluids, drilling muds and other fluids and media used in subterranean wells.

Wetting agents and emulsifiers that may be suitable for use in this invention include crude tall oil, oxidized crude tall oil, surfactants, organic phosphate esters, modified imidazolines and aridoamines, alkyl aromatic sulfates and sulfonates, and the like, and combinations or derivatives of these. VERSAWET™ and VERSACOAT™ and NOVA-MUL™ are examples of commercially available emulsiflers manufactured and distributed by M-I, L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers and gellants, such as oil soluble polymers, polyamide resins, polycarboxylic acids and soaps can also be used. Attapulgite clay and sepiolite clay may also be used as viscosifiers. The amount of viscosifier used in the composition can vary depending upon the end use of the composition. However, normally about 0.1% to 6% by weight range are sufficient for most applications. VG-690™ and VG-PLUS™ are organoclay materials distributed by M-I, L.L.C., and VERSA-HRP™ is a polyamide resin material manufactured and distributed by M-I, L.L.C., that may be used in this invention.

Weighting agents or density materials suitable for use in this invention include hematite, magnetite, iron oxides, illmenite, barite, siderite, celestite, dolomite, calcite, manganese oxides, halites and the like. The quantity of such material added, if any, depends upon the desired density of the final composition. Typically, weight material is added to result in a density of up to about 22 pounds per gallon. The weight material is preferably added to achieve a density of up to 20 pounds per gallon and most preferably up to 19.5 pounds per gallon.

Fluid loss control agents typically act by coating the walls of the well. Suitable fluid loss control agents which may find utility in this invention include modified lignites, asphaltic compounds, gilsonite, organophilic humates or tannins prepared by reacting humic acid or tannic acid with amides or polyalkylene polyamines, and latex polymers. Typically, fluid loss control agents are added in amounts less than about 10% and preferably less than about 5% by weight of the fluid.

Corrosion inhibitors may also be added to the drilling fluid compositions of this invention to control the corrosion of the drilling equipment used during the drilling operation. Depending upon the type of corrosion encountered, the corrosion inhibitor may be organic or inorganic or some combination thereof. Illustrative examples of such corrosion inhibitors include phosphates, silicates, borates, zinc compounds, organic amines, benzoic acid, and benzoic acid derivatives, phosphate esters, heterocyclic nitrogen and sulfur compounds, organic acids and the like. Examples of commercially available corrosion inhibitors include sodium benzoate and benzotriazole.

In view of the above, one of skill in the art should appreciate the usefulness of the above described compositions. Further one of skill in the art should recognize that the compositions of the present invention may be used as a drilling fluid or drilling mud or as a component of a drilling fluid or drilling mud. The use of drilling fluids and drilling muds should be within the skill of one in the well drilling arts and the usefulness of the present invention should be apparent to such a person.

The following examples are included to demonstrate preferred embodiments of the invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

GENERAL INFORMATION RELEVANT TO THE EXAMPLES

These tests were conducted in accordance with the appropriate published API procedures and in particular in API Bulletin RP 13B-2, 1990, the contents of which are hereby incorporated herein by reference. The following abbreviations are used in describing the following examples:

"DPNB" is dipropylene glycol n-butyl ether.

"DEG" is diethylene glycol.

"TPNB" is tripropylene glycol n-butyl ether.

"HA" means a heat aged fluid.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"GELS" is a measure of the suspending characteristics, or the thixotropic properties of a drilling fluid, measured in pounds per 100 square feet (lb/100 ft$^2$).

Conductivity for each sample was measured in microsiemens per centimeter ($\mu$s/cm) using a traceable conductivity meter from Fischer Scientific Co.

EXAMPLE 1

A fluid illustrative of the present invention was formulated as follows:

| Formulation 1 | |
| --- | --- |
| DPNB | 215 g |
| DEG | 45 g |
| NaBr Brine (12.5 lb./gal.) | 8.62 g |
| VG-PLUS | 15.0 g |
| VERSA HRP | 2.5 g |
| Barite | 250 g |

In the above table, the DPNB and DEG glycol ethers are available from Dow Chemical; VG-PLUS is an organophilic clay available from M-I, L.L.C.; VERSA HRP is a polyamide resin available from M-I, L.L.C.; and all other components are technical grade chemicals commonly available.

The above formulation was mixed on a Silverson mixer for 10 minutes. The following properties for Formulation 1 were obtained at room temperature.

| PV | 17 |
| --- | --- |
| YP | 2 |
| GELS | |
| 10 sec. | 4 |
| 10 min. | 5 |
| Conductivity $\mu$s/cm | 80 |

The above formulation was combined with 2.0 g of VERSAMOD, 25 g Rev Dust and 7 g of DUROGEL (sepiolite clay). VERSAMOD is a gellant available commercially from M-I, L.L.C. The mixture was further sheared on a Silverson mixer at 8000 rpm for 3 minutes. The following properties were measured.

| PV | 22 |
| --- | --- |
| YP | 14 |
| Gels | |
| 10 sec. | 13 |
| 10 min. | 20 |
| Conductivity $\mu$s/cm | 90 |

Upon review one of skill in the art should recognize that the above results indicate that conductive fluids usefull in the logging of subterranean well can be prepared using the principles of this invention.

EXAMPLE 2

A fluid illustrative of the present invention was formulated as follows:

| Formulation 2 | |
| --- | --- |
| DPNB | 200 g |
| DEG | 40 g |
| NaBr Brine (12.5 ppg solution) | 8 g |
| DUROGEL | 10 g |
| Barite | 250 g |

In the above table, the DPNB and DEG glycol ethers are available from Dow Chemical; DUROGEL is a sepiolite clay available from M-I, L.L.C.; and all other components are technical grade chemicals commonly available.

The above formulation was mixed on Silverson mixer at 8000 rpm for 10 minutes. The above fluid was heat aged at 150° F. for 16 hours. The following initial and heat aged properties were measured for Formulation 2:

| | Initial | HA at 150° F. |
| --- | --- | --- |
| PV | 23 | 28 |
| YP | 8 | 18 |
| GELS | | |
| 10 sec. | 8 | 12 |
| 10 min. | 9 | 15 |
| Conductivity $\mu$s/cm | 75 | 64 |

Upon review one of skill in the art should recognize that the above results indicate that conductive fluids useful in the logging of subterranean wells can be prepared using the principles of this invention.

EXAMPLE 3

The following example illustrates the inhibition of shale hydration of the fluids of the present invention.

About 10 g of active shale was added to a portion of the Formulation 2 fluid after which the mixture was heat aged at 150° F. for about 90 minutes. After heat aging, the mixture was screened through 80 mesh screen and the resulting shale particles were washed with petroleum ether and dried. The recovered shale was weighed. As a control experiment, 10 g of active shale was added to deionized water (D.I. H$_2$O) and treated in a similar manner. The following results were obtained:

| Fluid | D.I. H$_2$O | Formulation 2 |
|---|---|---|
| % recovery | 0% (all dispersed) | 100% |

Upon review of the above results, one of skill in the art should understand that a fluid formulated in accordance to the present invention inhibits the hydration of shale. Further such a skilled person should appreciate that the fluids of the present invention may be used in the electrical logging of a subterranean well while maintaining the stability of shales exposed to the fluid.

EXAMPLE 4

The following example illustrates the oil-miscible nature of the fluids formulated in accordance with the principles of the present invention.

Portions of the Formulation 2 fluid were treated with 3% of each I.O. $C_{16}$–$C_{18}$ synthetic hydrocarbon and isopropyl pahiitate and the properties were measured on these fluids after mixing for 10 minutes. IO $C_{16}$–$C_{18}$ is a mixture of predominantly $C_{16}$ and $C_{18}$ olefins available from AMOCO Chemicals.

|  | 3% IO $C_{16}$–$C_{18}$ | 3% IO $C_{16}$–$C_{18}$ + 3% IP-Palmitate |
|---|---|---|
| PV | 27 | 26 |
| YP | 16 | 17 |
| GELS |  |  |
| 10 sec. | 10 | 11 |
| 10 min. | 10 | 12 |
| Conductivity μs/cm | 56 | 55 |

In view of the above results, one of skill in the art should understand that the conductive fluids formulated in accordance with this invention have miscibility with various oleaginous fluids. Further such a skilled person should appreciate that the medium of the present invention may be used in the electrical logging of a subterranean well drilled with it as drilling fluid.

EXAMPLE 5

The following illustrative example shows that the fluids of the present invention are compatible with conventional drilling mud components and additives. The following two Formulations were made:

| Formulation 3 |  | Formulation 4 |  |
|---|---|---|---|
| TPNB | 124 g | TPNB | 124 g |
| DEG | 104 g | DEG | 104 g |
| NaBr Brine (12.5 ppg solution) | 20 g | NaBr Brine (12.5 ppg solution) | 20 g |
|  |  | DUROGEL | 5 g |
|  |  | Silwet-7622 | 4 g |
|  |  | Emphos-222 | 1.0 g |
|  |  | Barite | 250 g |

In the above table, the TPNB and DEG glycol ethers are available from Dow Chemical; DUROGEL is a sepiolite clay available from M-I, L.L.C.; Silwet-7622 is a surfactant/wetting agent available from Union Carbide Chemical Company Inc.; Emphos-222 is a phosphate ester surfactant available from Witco Chemicals; and all other components are technical grade chemicals commonly available.

Formulation 3 fluid has a conductivity of about 201 μs/cm while the Formulation 4 fluid has conductivity of about 182.4 μs/cm.

The Formulation 4 fluid was heat aged at 150° F. for 4 hours. The following heat aged properties were measured.

| PV | 57 |
|---|---|
| YP | 14 |
| GELS |  |
| 10 sec. | 8 |
| 10 min. | 10 |
| Conductivity μs/cm | 157 |

Upon review of the above results, one of ordinary skill in the art should understand that the conductivity of the fluids of this invention can be varied by adjustment of water soluble glycol and salt content of the fluid, while yet maintaining satisfactory viscosity and gel characteristics.

EXAMPLE 6

The following comparative example is illustrative of the properties and characteristics of a conventional inhibitive invert emulsion oil base fluid. The conventional inhibitive invert emulsion oil-based fluid was prepared according to the following formulation:

| Formulation 5 |  |
|---|---|
| LVT-200 | 167 g |
| Lime | 2.0 |
| VG-Plus | 8.0 |
| VERSACOAT | 4.0 |
| VERSAWET | 2.0 |
| CaCl$_2$ Brine (25%) | 70 g |
| Barite | 290 |

In the above table LVT-200 is a mineral oil available from Conoco; VG-PLUS is an organophilic clay available from M-I, L.L.C.; VERSACOAT is a surfactant package available from M-I, L.L.C.; VERSAWET is a wetting agent available from M-1, L.L.C.; and all other components are technical grade chemicals commonly available.

The above conventional invert emulsion oil-based fluid wag prepared by mbdng the materials in order shown above on a Hamilton Beach mixer. The following properties were measured at room temperature initially and after heat aging at 150° F. for 16 hours.

|  | Initial | HA/150° F. |
|---|---|---|
| PV | 34 | 28 |
| YP | 7 | 15 |
| GELS |  |  |
| 10 sec. | 6 | 9 |
| 10 min. | 9 | 12 |
| Conductivity μs/cm | 0 | 0 |

Given the above results, one of ordinary skill in the art would understand that that the conventional inhibitive oil base fluids are non-conductive when compared with fluids of this invention.

EXAMPLE 7

A fluid illustrative of the present invention was formulated as follows:

| Formulation: 6 | |
| --- | --- |
| PNB | 200.0 g |
| Propylene glycol | 19.0 g |
| MgCl$_2$ hexahydrate | 1.0 g |
| Water | 2.0 g |

The above fluid has conductivity of 3.86 μs/cm. The above fluid was mixed with 7.0 g of DUROGEL and 150 g of barite. It was then mixed on a Silverson mixer at 8000 rpm for five minutes. The following Theological properties were measured initially and after heat aging at 150° F. for 16 hours.

| | Initial | HA/150° F./16 hours |
| --- | --- | --- |
| PV | 14 | 16 |
| YP | 12 | 7 |
| Gels | | |
| 10 sec | 7 | 7 |
| 10 min | 10 | 8 |
| Conductivity μs/cm | 5.86 | 5.34 |

Upon review one of skill in the art should recognize that the above results indicate that conductive fluids useful in the logging of subterranean wells can be prepared using the principles of this invention.

EXAMPLE 8

A fluid illustrative of the present invention was formulated as follows:

| Formulation: 7 | |
| --- | --- |
| PNB | 100 g |
| NaBr salt | 10 g |
| DEG | 90 g |

The above Formulation was prepared by first dissolving sodium bromide in DEG and then adding PNB to sodium bromide solution of DEG. This formulation had conductivity of 798 μs/cm.

To the above conductive medium was added 5.0 grams of DUROGEL and 200 grams of barite, followed by mixing on a Silverson mixer at 8000 pm for 5 minutes. The following rheologies were measured before and after heat aging at 150° F. for 16 hours.

| | Initial | HA/150° F./16 hours |
| --- | --- | --- |
| PV | 46 | 47 |
| YP | 17 | 16 |
| Gels | | |
| 10 sec | 9 | 9 |
| 10 min | 13 | 10 |
| Conductivity μs/cm | 568 | 649 |

Upon review one of skill in the art should recognize that the above results indicate that conductive fluids useful in the logging of subterranean wells can be prepared using the principles of this invention.

EXAMPLE 9

A fluid illustrative of the present invention was formulated as follows:

| Formulation: 8 | |
| --- | --- |
| DEG | 45 g |
| 20% Sodium Acetate brine | 5 g |
| DPNB | 150 g |

The above fluid has conductivity of 86 μs/cm. To this fluid was added 5.0 grams DUROGEL and 150 grams of Barite. It was then mixed on a Silverson mixer at 8000 rpm for 5 minutes. The following initial and heat aged (150° F. for 16 hours) properties were measured.

| | Initial | HA/150° F./16 hours |
| --- | --- | --- |
| PV | 23 | 26 |
| YP | 14 | 12 |
| Gels | | |
| 10 sec | 5 | 7 |
| 10 min | 8 | 8 |
| Conductivity μs/cm | 103 | 82 |

Upon review one of skill in the art should recognize that the above results indicate that conductive fluids useful in the logging of subterranean wells can be prepared using the principles of this invention.

EXAMPLE 10

A fluid illustrative of the present invention was formulated as follows:

| Formulation: 9 | |
| --- | --- |
| DEG | 45.0 g |
| 20% Sodium Acetate brine (20% by weight in water) | 5.0 g |
| DPNB | 15.0 g |

The above fluid has conductivity of 17 μs/cm. To this fluid was added 5.0 grams DUROGEL and 150 grams of Barite. It was then mixed on a Silverson mixer at 8000 rpm for 5 minutes. The following initial and heat aged (150° F. for 16 hours) properties were measured.

| | Initial | HA/150° F./16 hours |
| --- | --- | --- |
| PV | 32 | 40 |
| YP | 12 | 12 |
| Gels | | |
| 10 sec | 4 | 6 |
| 10 min | 7 | 7 |
| Conductivity μs/cm | 16.3 | 20.2 |

Upon review one of skill in the art should recognize that the above results indicate that conductive fluids useful in the logging of subterranean wells can be prepared using the principles of this invention.

EXAMPLE 11

An illustrative conductive fluid of this invention was prepared according to the following formulation:

| Formulation 10. | |
|---|---|
| DEG | 90 g |
| Sodium Acetate salt | 10 g |
| DPNB | 100 g |

The above fluid has conductivity of 235 $\mu$s/cm. To this solution was added 7.0 grams DUROGEL and 150 grams of Barite. It was then mixed on a Silverson mixer at 8000 rpm for 5 minutes. The following initial and heat aged properties (150° F. for 16 hours) were measured.

| | Initial | HA/150° F./16 hours |
|---|---|---|
| PV | 64 | 76 |
| YP | 13 | 10 |
| Gels | | |
| 10 sec | 4 | 6 |
| 10 min | 7 | 7 |
| Conductivity $\mu$s/cm | 194 | 213 |

Upon review one of skill in the art should recognize that the above results indicate that conductive fluids useful in the logging of subterranean wells can be prepared using the principles of this invention.

EXAMPLE 12

The illustrative conductive fluid of this invention was prepared according to the following formulation:

| Formulation 11 | |
|---|---|
| Propylene glycol | 90 g |
| Sodium Acetate salt | 10 g |
| DPNB | 100 g |

The above fluid has conductivity of 388 $\mu$s/cm. To this solution was added 5.0 grams DUROGEL and 150 grams of Barite. The fluid was mixed on a Silverson mixer at 8000 rpm for 5 minutes. The following initial and heat aged (150° F. for 16 hours) properties were measured.

| | Initial | HA/150° F./16 hours |
|---|---|---|
| PV | 64 | 73 |
| YP | 8 | 9 |
| Gels | | |
| 10 sec | 2 | 4 |
| 10 min | 5 | 5 |
| Conductivity $\mu$s/cm | 238 | 300 |

Upon review one of skill in the art should recognize that the above results indicate that conductive fluids useful in the logging of subterranean wells can be prepared using the principles of this invention.

EXAMPLE 13

The following mud formulation was prepared to demonstrate the utility of glycol ethers of this invention to prepare invert emulsion drilling fluids in a deionized water (D.I. water), fresh water (tap water), sea water and 25% $CaCl_2$ brine.

| Formulation | Grams |
|---|---|
| TPNB | 177 |
| Lime | 4.0 |
| VG PLUS | 4.0 |
| NOVAMUL | 8.0 |
| VERSAWET | 2.0 |
| Sil Wet - 766 | 2.0 |
| Aqueous Phase | 84 (ml) |
| Barite | 224 |

The above formulations were mixed separately with deionized water (DI water), fresh water, sea water and 25% $CaCl_2$ brine used as aqueous phase. These formulations were heat aged at 150° F. for 16 hours. The following rheologies were measured at room temperature before (Initial) and after heat aging (HA). Conductivity for each sample was measured in microsiemens using a traceable conductivity meter from Fischer Scientific Co.

| | Mud-12 D.I. Water | | Mud-13 Fresh Water | | Mud-14 Sea Water | | Mud-15 $CaCl_2$ | |
|---|---|---|---|---|---|---|---|---|
| | Initial | HA | Initial | HA | Initial | HA | Initial | HA |
| E.S. | 17 | 17 | 16 | 18 | 16 | 21 | 35 | 48 |
| Conductivity ($\mu$s/cm) | 6.8 | 5.2 | 7.9 | 6.9 | 8.1 | 5.6 | 2.9 | 2.2 |
| PV | 45 | 56 | 51 | 58 | 50 | 59 | 41 | 58 |
| YP | 9 | 8 | 8 | 9 | 9 | 6 | 38 | 35 |
| Gels | | | | | | | | |
| 10 sec | 6 | 7 | 7 | 7 | 7 | 5 | 15 | 16 |
| 10 min. | 8 | 9 | 9 | 10 | 9 | 7 | 20 | 17 |

In view of the above results, one of skill in the art should conclude that one can form invert emulsions with the fluid medium of this invention.

EXAMPLE 14

The following invert emulsion drilling mud was formulated in accordance with the present invention in which: TOMAH Q-17-2PG is 75% Quaternary Amine Salt in Propylene Glycol available commercially from Tomah Products, Inc. of Milton, Wis. USA and Shrieve 545× is a polypropylene glycol butyl ether blend commercially available. Tru-Vis HT (organophillic clay viscosifier), Tru-Flo 100 (fluid loss control agent) Vers-Vert F (fluid loss control agent) are proprietary formulations, used in the formulation of drilling fluids commercially available from M-I LLC. IO16-18 is an isomerized internal olefin synthetic hydrocarbon having 16–18 carbon atoms.

| Mud Formulation A | |
|---|---|
| Mud Weight: 14 ppg Component | Oil to Water Ratio: 80:20 |
| IO16-18 | 137.5 g |
| Versa Mul | 11.0 g |
| Versa Coat | 4.0 g |
| Lime | 3.0 g |
| Tru-Vis HT | 5.0 g |
| Tru-Flo 100 | 1.5 g |
| Versa-Vert F | 4.0 g |
| CaCl$_2$ (95%) | 13.0 g |
| Freshwater | 36.2 g |
| Barite | 355.0 g |
| Shrieve 545X | 18 g |
| TOMAH Q-17-2P | 12 g |

The above mud had the following properties prior to and after heat aging:

| PERIOD AGED (hours) | 0 | 16 | 16 | 16 |
|---|---|---|---|---|
| Temp. (° F.) | 70 | 150 | 250 | 300 |
| 600 RPM | 125 | 97 | 109 | 94 |
| 300 RPM | 71 | 55 | 62 | 58 |
| 200 RPM | 51 | 40 | 47 | 44 |
| 100 RPM | 36 | 24 | 30 | 30 |
| 6 RPM | 8 | 9 | 11 | 13 |
| 3 RPM | 6 | 7 | 9 | 11 |
| GELS 10 seconds (lb f/100 ft$^2$) | 9 | 13 | 13 | 18 |
| GELS 10 minutes (lb f/100 ft$^2$) | 13 | 19 | 17 | 24 |
| PV @ 120° F. (cP) | 54 | 42 | 47 | 36 |
| YP @ 120° F. (lb f/100 ft$^2$) | 17 | 13 | 15 | 22 |
| ES @ 120° F. (volts) | 6 | 6 | 7 | 17 |
| Conductivity @ 120° F. ($\mu$S/cm) | 2200 | 247 | 190 | 11.3 |
| Conductivity @ 80° F. ($\mu$S/cm) | 1720 | 522 | 60 | 48 |
| API HPHT @ 250° F. (cc) | | | | 4.4/.4 |

Upon review of the above one of ordinary skill in the art should appreciate that the results of the present invention can be achieve by use of a quaternary amine as the electrolytic salt.

EXAMPLE 15

One of skill in the art should appreciate that contaminates may become part of the drilling fluid during the course of drilling the well. The following tests the impact of a sample of common contaminates on the drill fluids of the present invention. The drilling fluids used in this example were of the same formulation as that in Example 14.

| Formulation A + contaminate = Contaminate | B | C | D |
|---|---|---|---|
| | Amount (% wt) | | |
| Class H Cement | 10 | | |
| Zechstein Brine | | 10 | |
| Rev Dust | | | 5 |

The above mud had the following properties prior to and after heat aging:

| Formulation PERIOD | B | | C | | D | |
|---|---|---|---|---|---|---|
| AGED (hours) | 0 | 16 | 0 | 16 | 0 | 16 |
| Temp. (° F.) | 70 | 250 | 70 | 250 | 70 | 250 |
| 600 RPM | 134 | 126 | 119 | 111 | 139 | 177 |
| 300 RPM | 78 | 74 | 71 | 63 | 86 | 113 |
| 200 RPM | 58 | 56 | 53 | 47 | 66 | 88 |
| 100 RPM | 36 | 35 | 33 | 28 | 43 | 62 |
| 6 RPM | 14 | 12 | 7 | 5 | 17 | 34 |
| 3 RPM | 12 | 10 | 5 | 3 | 16 | 31 |
| GELS 10 seconds (lb f/100 ft$^2$) | 24 | 14 | 5 | 5 | 29 | 47 |
| GELS 10 minutes (lb f/100 ft$^2$) | 31 | 21 | 9 | 11 | 34 | 81 |
| PV @ 120° F. (cP) | 56 | 52 | 48 | 48 | 53 | 64 |
| YP @ 120° F. (lb f/100 ft$^2$) | 22 | 22 | 23 | 15 | 33 | 49 |
| ES @ 120° F. (volts) | 7 | 6 | 6 | 6 | 6 | 7 |
| Conductivity @ 120° F. ($\mu$S/cm) | 280 | 1600 | 588 | 1900 | 870 | 120 |

The above shows that contamination of the muds formulated in accordance with the present invention does not substantially harm the desire properties of the drilling fluids of the present invention.

EXAMPLE 16

The drilling mud of Example A was tested for its ability to prevent the dispersion of hydratable clays. In particular, a clay sample of solid was added to the drilling fluid or drilling mud A and hot rolled for 16 hours at 150° F. After hot rolling the clay sample were recovered, washed with hexane and dried in air. The percent recovery of solid sample are given in the following table:

| Clay Sample | Percent Recovery |
|---|---|
| Foss Eikeland shale | 70.4 |
| Oxford shale | 86.7 |
| Crude Bentonite | 89.0 | hot rolling (dispersion) conditions: 150° F. 16 hr ~40 ppb

Based on the above information, one of skill in the art should understand that the drilling fluids of the present invention inhibit the hydration and dispersion of hydratable clays that may be encountered during the drilling process.

EXAMPLE 17

The following example illustrates the ability of the mud formulations of the present invention to withstand a cycling of temperature. The following mud formulation was made in accordance with the present invention:

| Mud Weight: 14 ppg Component | Oil to Water Ratio: 80:20 |
|---|---|
| IO16-18 | 137.5 g |
| Versa Mul | 11.0 g |
| Versa Coat | 4.0 g |
| Lime | 3.0 g |

-continued

| Mud Weight: 14 ppg Component | Oil to Water Ratio: 80:20 |
|---|---|
| Tru-Vis HT | 5.0 g |
| Tru-Flo 100 | 1.5 g |
| Versa-Vert F | 4.0 g |
| CaCl$_2$ (95%) | 13.0 g |
| Freshwater | 36.2 g |
| Barite | 355.0 g |
| TPNB | 18 g |
| TOMAH Q-17-2P | 12 g |

The above mud formulation was heat aged at various temperatures and gave the following representative properties:

| Sample | E | F | G | H | I | J | K | L | M |
|---|---|---|---|---|---|---|---|---|---|
| PERIOD AGED (HOURS) | 16 | 16 | 16 | 32 | 32 | 32 | 16 | 16 | 16 |
| TEMPERATURE (° F.) | 150 | 200 | 250 | 150 | 200 | 250 | 300 | 200 | 150 |
| Conductivity 80 F. ($\mu$S/cm) | 716 | 637 | 695 | 2100 | 1450 | 2700 | 1800 | 1430 | 2.2 |
| Conductivity 180 F. ($\mu$S/cm) | 840 | 695 | 224 | 2800 | 2700 | 4000 | | | |

The conductivity of muds K and L were measured during the course of the ramp up of temperature giving the following representative results:

| Sample: | K | L |
|---|---|---|
| Conductivity @ 80° F. ($\mu$S/cm) | 1800 | 1430 |
| Conductivity @ 100° F. ($\mu$S/cm) | 2200 | 1290 |
| Conductivity @ 120° F. ($\mu$S/cm) | 2300 | 1630 |
| Conductivity @ 140° F. ($\mu$S/cm) | 2400 | 1800 |
| Conductivity @ 160° F. ($\mu$S/cm) | 2210 | 2120 |
| Conductivity @ 180° F. ($\mu$S/cm) | 1710 | 2205 |
| Conductivity @ 160° F. ($\mu$S/cm) | 1330 | 1600 |
| Conductivity @ 140° F. ($\mu$S/cm) | 1220 | 1430 |
| Conductivity @ 120° F. ($\mu$S/cm) | 940 | 900 |
| Conductivity @ 100° F. ($\mu$S/cm) | 780 | 545 |
| Conductivity @ 80° F. ($\mu$S/cm) | 390 | 390 |

After heat aging the samples K and L exhibited representative properties as shown below

| Sample | K | L |
|---|---|---|
| 600 RPM | 80 | 81 |
| 300 RPM | 46 | 50 |
| 200 RPM | 36 | 38 |
| 100 RPM | 22 | 26 |
| 6 RPM | 11 | 13 |
| 3 RPM | 8 | 10 |
| GELS 10 seconds (lbf/100 ft$^2$) | 14 | 16 |
| GELS 10 minutes (lbf/100 ft$^2$) | 23 | 30 |
| PV @ 120° F. (cP) | 34 | 31 |
| YP @ 120° F. (lbf/100 ft$^2$) | 12 | 19 |
| ES @ 120 ° F. (volts) | 6 | 6 |
| HPHT250F:500dP:2.7um, cc | 0.8/0 | 1.2/0 |

One of skill in the art should appreciate that the above fluids formulated in accordance with the present invention may be useful in the drilling of subterranean wells.

EXAMPLE 18

The following example was carried out to demonstrate the utility of various amount and types of quaternary amine salts and organic polar solvent in achieving the results of the present invention. The following drilling mud was formulated in accordance with the teachings of the present invention utilizing TOMAH Q-18-2 (otcadecyldihydroxyethylmethylammonium chloride) available from Tomah Products, Inc. of Milton, Wis. USA:

| Component | M |
|---|---|
| 1O16-18 | 137.5 |
| Versa Mul | 11.0 |
| Versa Coat | 4.0 |
| Lime | 3.0 |
| Tru-Vis HT | 5.0 |
| Tru-Flo 100 | 1.5 |
| Versa Vert F | 4.0 |
| CaCl$_2$ (95%) | 13.0 |
| Freshwater | 36.2 |
| Barite | 355.0 |
| TPNB | 18.0 |
| TOMAH Q-18-2 | 18.0 |

The properties of the above mud formulation were tested and then the mud was subjected to hot-rolling for 16 hours at 15° F. The following data presents representative data:

| PERIOD AGED (HOURS) | 0 | 16 |
|---|---|---|
| TEMPERATURE (° F.) | 70 | 150 |
| 600 RPM | 108 | 94 |
| 300 RPM | 58 | 52 |
| 200 RPM | 43 | 38 |
| 100 RPM | 26 | 21 |
| 6 RPM | 9 | 7 |
| 3 RPM | 8 | 6 |
| GELS 10 seconds (lbf/100 ft$^2$) | 10 | 8 |
| GELS 10 minutes (lbf/100 ft$^2$) | 18 | 15 |
| PV @ 120° F. (cP) | 50 | 42 |
| YP @ 120° F. (lbf/100 ft$^2$) | 8 | 10 |
| ES @ 120° F. (volts) | 6 | 6 |
| Conductivity @ 120° F. ($\mu$S/cm) | 800 | 840 |
| Conductivity @ 80° F. ($\mu$S/cm) | 990 | 1250 |

One of skill in the art should appreciate that other than the preferred quaternary amine salts and polar organic solvents can be utilized to achieve the results of the present invention.

EXAMPLE 19

Drilling fluids with various amounts of oil:water ratios and percent calcium chloride salinity were subjected to hot rolling at 300° F. The muds were formulated as shown below:

| Materials (grams unless otherwise indicated) | P | Q | R | S | T |
|---|---|---|---|---|---|
| 1O16-18 | 133.0 | 141.0 | 125.0 | 125.0 | 115.0 |
| Versa Mul | 11.0 | 11.0 | 11.0 | 11.0 | 11.0 |
| Versa Coat | 4.0 | 4.0 | 4.0 | 4.0 | 4.0 |
| Lime | 3.0 | 3.0 | 3.0 | 3.0 | 3.0 |
| Tru-Vis HT | 5.0 | 5.0 | 5.0 | 5.0 | 5.0 |
| Tru-Flo 100 | 1.5 | 1.5 | 1.5 | 1.5 | 1.5 |
| Versa Vert F | 4.0 | 4.0 | 4.0 | 4.0 | 4.0 |
| $CaCl_2$ (95%) | 11.0 | 8.3 | 14.0 | 19.0 | 16.4 |
| Freshwater | 41.0 | 31.0 | 52.0 | 52.0 | 61.6 |
| Barite | 337.0 | 342.0 | 331.0 | 327.0 | 336.0 |
| Shrieve 545X | 18 | 18 | 18 | 18 | 18 |
| TOMAH Q-17-2P | 12 | 12 | 12 | 12 | 12 |
| Oil:Water Ratio | 80:20 | 85:15 | 75:25 | 75:25 | 70:30 |
| $CaCl_2$ (95%) % Salinity | 20 | 20 | 20 | 25 | 20 |

The above fluids were heat aged at 300° F. and the following results are representative of the resulting data:

| Formulation | P | Q | R | S | T |
|---|---|---|---|---|---|
| 600 RPM | 83 | 83 | 81 | 78 | 115 |
| 300 RPM | 49 | 49 | 49 | 46 | 72 |
| 200 RPM | 38 | 37 | 38 | 36 | 58 |
| 100 RPM | 26 | 26 | 27 | 24 | 40 |
| 6 RPM | 12 | 11 | 12 | 9 | 18 |
| 3 RPM | 9 | 8 | 16 | | |
| GELS 10 seconds (lbf/100 ft$^2$) | 18 | 16 | 14 | 11 | 24 |
| GELS 10 minutes (lbf/100 ft$^2$) | 30 | 26 | 19 | 16 | 39 |
| PV @ 120° F. (cP) | 34 | 34 | 32 | 32 | 43 |
| YP @ 120° F. (lbf/100 ft$^2$) | 15 | 15 | 17 | 14 | 29 |
| ES @ 120° F. (volts) | 6 | 6 | 6 | 6 | 17 |
| Conductivity @ 120° F. ($\mu$S/cm) | 1390 | 610 | 1740 | 1350 | 132 |

The above data should demonstrate to one of skill in the art that the properties of the drilling fluids of the present invention can be varied by adjustment of the ratio of conductive package and salinity/water content.

EXAMPLE 20

Drilling fluids with various amounts of oil:water ratios and percent calcium chloride salinity were subjected to hot rolling at 300° F. The muds were formulated as shown below:

| Materials (grams unless otherwise indicated) | U | V | W | X | Y |
|---|---|---|---|---|---|
| IO16-18 | 146.0 | 146.0 | 138.3 | 122.7 | 114.9 |
| Versa mul | 11.0 | 11.0 | 11.0 | 11.0 | 11.0 |
| Versa coat | 4.0 | 4.0 | 4.0 | 4.0 | 4.0 |
| Lime | 3.0 | 3.0 | 3.0 | 3.0 | 3.0 |
| Truvis HT | 5.0 | 5.0 | 5.0 | 5.0 | 5.0 |
| Truflo 100 | 1.5 | 1.5 | 1.5 | 1.5 | 1.5 |
| Versa Vert F | 4.0 | 4.0 | 4.0 | 4.0 | 4.0 |
| $CaCl_2$ (95%) | 5.4 | 19.0 | 10.8 | 18.2 | 21.9 |
| Freshwater | 20.3 | 20.2 | 30.4 | 50.9 | 61.2 |
| Barite | 357.6 | 356.0 | 350.0 | 337.6 | 331.4 |
| Shrieve 545X | 18 | 18 | 18 | 18 | 18 |
| TOMAH Q-17-2P | 12 | 12 | 12 | 12 | 12 |
| Oil:Water Ratio | 90:10 | 90:10 | 85:15 | 75:25 | 70:30 |
| CaCl2 (95%) % Salinity | 20 | 25 | 25 | 25 | 25 |

The above fluids were heat aged for 16 hours at 300° F. and the following results are representative of the resulting data:

| Formulation | U | V | W | X | Y |
|---|---|---|---|---|---|
| 600 RPM | 114 | 88 | 96 | 107 | 96 |
| 300 RPM | 75 | 55 | 60 | 64 | 60 |
| 200 RPM | 61 | 45 | 48 | 53 | 50 |
| 100 RPM | 43 | 32 | 33 | 36 | 35 |
| 6 RPM | 22 | 17 | 18 | 17 | 8 |
| 3 RPM | 22 | 16 | 17 | 16 | 8 |
| GELS 10 seconds (lbf/100 ft$^2$) | 34 | 28 | 30 | 25 | 24 |
| GELS 10 minutes (lbf/100 ft$^2$) | 42 | 36 | 45 | 37 | 38 |
| PV @ 120° F. (cP) | 39 | 33 | 36 | 43 | 36 |
| YP @ 120° F. (lbf/100 ft$^2$) | 36 | 22 | 24 | 21 | 24 |
| ES @ 120° F. (volts) | 18 | 268 | 122 | 5 | 6 |
| Conductivity @ 120° F. ($\mu$S/cm) | 11.5 | 0.7 | 2.3 | 1670 | 24K |

The above data should demonstrate to one of skill in the art that the properties of the drilling fluids of the present invention can be varied by adjustment of the ratio of conductive package and salinity/water content.

EXAMPLE 21

The following drilling fluids were formulated to test the properties of the filtrate resulting after heat aging and passing through a 35 micron filter.

| Materials (grams unless otherwise indicated) | Formulation Z |
|---|---|
| 1O16-18 | 137.5 |
| Versa Mul | 11.0 |
| Versa Coat | 4.0 |
| Lime | 3.0 |
| Tru-Vis HT | 5.0 |
| Tru-Flo 100 | 1.5 |
| Versa Vert F | 4.0 |
| $CaCl_2$ (95%) | 13.0 |
| Freshwater | 36.2 |
| Barite | 0 |
| Shrieve 545X | 18 |
| TOMAH Q-17-2PG | 12 |

The above mud formulations were subjected to hot rolling at 150° F. and passed through a 35 micron filter. The following results are representative of the properties of the filtrate:

| Formulation | Z | |
|---|---|---|
| PERIOD AGED (hours) | 0 | 16 |
| Temp. (° F.) | 70 | 150 |

-continued

| Formulation | Z | |
|---|---|---|
| ES @ 120° F. (volts) | 7 | 6 |
| Conductivity @ 120° F. (µS/cm) | 1600 | 400 |

The above data should show to one of skill in the art that after heat aging the filtrate of the drilling fluids of the present invention maintain their conductive properties.

EXAMPLE 22

A field mud currently used in drilling operation in the Gulf of Mexico Mississippi Canyon was an invert emulsion drilling fluid. This fluid is a synthetic internal olefin based mud which was re-formulated by the addition of co-solvent and quaternary amine electrolytic salt to achieve the results of the present invention. Formulation AA serves as a control sample of the original mud formulation into which no co-solvent and electrolytic slat were added.

| Formulation | AA | BB |
|---|---|---|
| Synthetic : Water Ratio | 69:31 | 69:31 |
| Density (ppg) | 13.8 | 13.8 |
| LGS (%) | 8 | 8 |
| CaCl₂ (95%) Salinity (%) | 19 | 19 |
| TPNB (g) | 0 | 18 |
| TOMAH Q-17-2PG (g) | 0 | 12 |

The above fluids were heat aged and the following properties were measured:

| Formulation | AA | | BB | |
|---|---|---|---|---|
| PERIOD AGED (hours) | 0 | 16 | 0 | 16 |
| Temp. (° F.) | 70 | 150 | 70 | 150 |
| 600 RPM | 95 | — | 64 | 61 |
| 300 RPM | 55 | — | 36 | 32 |
| 200 RPM | 41 | — | 26 | 23 |
| 100 RPM | 27 | — | 16 | 14 |
| 6 RPM | 10 | — | 6 | 4 |
| 3 RPM | 8 | — | 4 | 3 |
| GELS 10 seconds (lbf/100 ft²) | 13 | — | 7 | 6 |
| GELS 10 minutes (lbf/100 ft²) | 15 | — | 12 | 7 |
| PV @ 120° F. (cP) | 40 | — | 28 | 29 |
| YP @ 120° F.(lbf/100 ft²) | 15 | — | 8 | 3 |
| ES @ 120° F.(volts) | 250 | 265 | 6 | 19 |
| Conductivity @ 120° F. (µS/cm) | 0.01 | 0.01 | 890 | 23 |

Upon review of the above, one of ordinary skill in the art should appreciate that the addition of the co-solvent and quaternary amine electrolytic salt of the present invention produce conductivity in field drilling muds.

In view of the above, one of ordinary skill in the art should understand an appreciate that one illustrative embodiment of the present invention includes a method for the electrical logging a subterranean well. Such an illustrative method may include the steps: placing into the subterranean well a logging medium, the logging medium including in the medium's continuous phase an oleaginous fluid, a polar organic solvent, and an electrolytic salt, the electrolytic salt being present in a concentration so as to permit the electrical logging of the subterranean well, and electrically logging the subterranean well. Preferably the method is carried out such that the oleaginous fluid utilized may further include a component selected from diesel, mineral oil, synthetic oil, vegetable oil, silicone oil, or combinations thereof in addition to the preferentially-oil-soluble glycol.

It is preferred that the polar organic solvent used in the above illustrative method be selected from propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. Likewise, it is preferred that the electrolytic salt utilized in the illustrative method be selected from: sodium chloride; sodium bromide; potassium chloride; ammoniun chloride; magnesium chloride; calcium chloride; calcium bromide; sodium acetate; potassium acetate; sodium citrate; a quaternary amine having the formula:

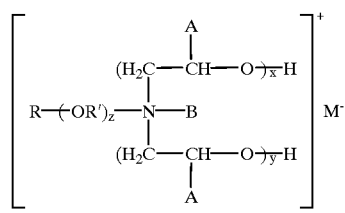

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M⁻ is a counter anion; or combinations thereof. Another preferred embodiment of the present illustrative method utilizes an electrolytic salt that is a quaternary amine having the formula:

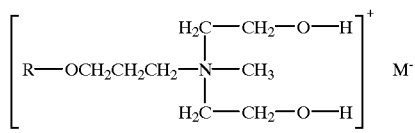

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride.

The logging medium utilized in the methods of the present invention may further include components found in drilling fluids. Thus in one such embodiment a gelling agent is included in the formulation of the logging medium and the gelling agent is preferably selected from clays, organophilic clays, polymers, polyamides, polymer emulsions or combinations thereof. Another such illustrative embodiment includes a weight material in the logging medium and preferably the weighting material is selected from hematite, magnetite, iron oxides, illmenite, barite, siderite, celestite, dolomite, calcite, manganese oxides, halites or combinations thereof. In yet a third illustrative embodiment, the logging medium further includes a corrosion inhibitor selected from phosphates, silicates, borates, zinc compounds, organic amines, benzoic acid, and benzoic acid derivatives, phosphate esters, heterocyclic nitrogen and sulfur compounds, organic acids or combinations thereof. And in another illustrative embodiment of the inventive method, the logging medium further includes surfactant, emulsifier, wetting agent, fluid loss control agent or combinations thereof The method of the present invention may also include drilling the well with a drilling fluid in which the logging medium of the present invention is a component of the drilling fluid in sufficient concentration so as to enable one to make electrical log measurements of the subterranean well. In such one such embodiment the logging medium serves as the drilling fluid, while in another the logging medium of the present invention is the internal phase of an invert emulsion drilling fluid.

Also encompassed within the scope of the present invention is a logging medium for use in taking the electrical log of a subterranean well. Such an illustrative logging medium may include in its continuous phase: an oleaginous fluid, a polar organic solvent, and an electrolytic salt, the salt being in a concentration so as to permit the electrical logging of a subterranean well. The illustrative logging medium should be formulated such that the oleaginous fluid is selected from diesel, mineral oil, synthetic oil, vegetable oil, silicone oil, or combinations thereof in addition to the preferentially-oil-soluble glycol. The polar organic solvent (also referred to as the co-solvent) is selected from propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. The electrolytic salt is preferably selected from salts that form a conductive logging medium and more preferably from the group including: sodium chloride, sodium bromide, potassium chloride, ammonium chloride, magnesium chloride, calcium chloride, calcium bromide, sodium acetate, potassium acetate, sodium citrate, a quaternary amine having the formula:

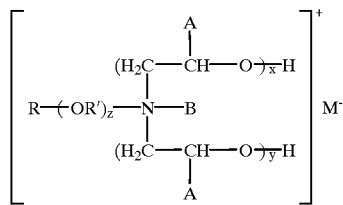

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and M⁻ is a counter anion; or combinations thereof. In another preferred embodiment, the electrolytic salt is a quaternary amine having the formula:

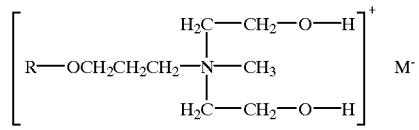

wherein M is any suitable anion, preferably halogen, and R being an alkyl have from 10 to 14 carbon atoms. In another illustrative embodiment of the present invention, the quaternary amine salt is isotridecyloxypropyldihydroxyethylmethylammonium chloride.

The illustrative logging medium may further include components common to a drilling fluid. Thus in one illustrative embodiment a gelling agent is added and preferably the gelling agent is selected from clays, organophilic clays, polymers, polyamides, polymer emulsions or combinations thereof. In another illustrative embodiment may include a weight material wherein the weight material is selected from hematite, magnetite, iron oxides, illmenite, barite, siderite, celestite, dolomite, calcite, magnesium oxides, halites or combinations thereof. Corrosion inhibitors may also be included in the formulation of the logging medium of the present invention and such corrosion inhibitors may be selected from phosphates, silicates, borates, zinc compounds, organic amines, benzoic acid, and benzoic acid derivatives, phosphate esters, heterocyclic nitrogen and sulfur compounds, organic acids or combinations thereof. The logging medium of the present illustrative embodiment may further include a surfactant, an emulsifier, a wetting agent, a fluid loss control agent and combinations thereof. The logging medium of the present invention may also be the continuous phase of an invert emulsion drilling fluid.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A method for the electrical logging a subterranean well comprising:

placing into the subterranean well a logging medium, said logging medium including in the medium's continuous phase an oleaginous fluid, a polar organic solvent, and an electrolytic salt, said electrolytic salt being present in a concentration so as to permit the electrical logging of the subterranean well, and electrically logging said subterranean well.

2. The method of claim 1 wherein said polar organic solvent comprises a glycol, glycol ether or mixture thereof.

3. The method of claim 1 wherein the polar organic solvent is selected from ethylene glycol, diethylene glycol, triethylene glycol, propylene glycol, butylene glycol, polyethylene glycol, polypropylene glycol, polyethylenepropylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof.

4. The method of claim 2 wherein said oleaginous fluid comprises a component selected from diesel, mineral oil, synthetic oil, vegetable oil, silicone oil, or combinations thereof.

5. The method of claim 1 wherein said logging medium is the external phase of an invert emulsion drilling fluid.

6. The method of claim 1 wherein the electrolytic salt is a quaternary amine salt having the formula:

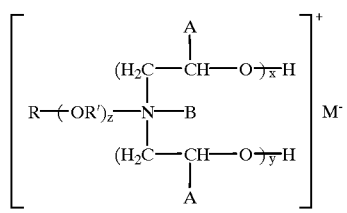

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and $M^-$ is a counter anion; or combinations thereof.

7. The method of claim 1 wherein the electrolytic salt is a quaternary amine salt having the formula:

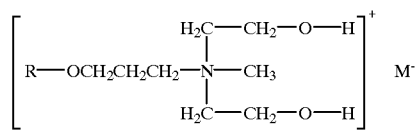

wherein M is any suitable anion, preferably halogen, and R being an alkyl have from 10 to 14 carbon atoms.

8. The method of claim 1 wherein the electrolytic salt is isotridecyloxypropyldihydroxyethylmethylammonium chloride.

9. The method of claim 1 wherein the logging medium further comprises a gelling agent is selected from clays, organophilic clays, polymers, polyamides, polymer emulsions or combinations thereof.

10. The method of claim 1 wherein the logging medium further comprises a weight material is selected from hematite, magnetite, iron oxides, illmenite, barite, siderite, celestite, dolomite, calcite, manganese oxides, halites or combinations thereof.

11. The method of claim 1 wherein said logging medium ether comprises corrosion inhibitor selected from phosphates, silicates, borates, zinc compounds, organic amines, benzoic acid, and benzoic acid derivatives, phosphate esters, heterocyclic nitrogen and sulfur compounds, organic acids or combinations thereof.

12. The method of claim 1 wherein said logging medium further comprises surfactant, emulsifier, wetting agent, fluid loss control agent or combinations thereof.

13. The method of claim 1 further comprising
drilling said well with a drilling fluid in which said logging medium is a component of said drilling fluid, said logging medium being in sufficient concentration so as to enable one to make electrical log measurements of the subterranean well.

14. A logging medium for use in taking the electrical log of a subterranean well, said logging medium comprising in its continuous phase:
an oleaginous fluid,
a polar organic solvent, and
an electrolytic salt, said salt being in a concentration so as to permit the electrical logging of a subterranean well.

15. The logging medium of claim 14 wherein said polar organic solvent comprises a glycol, glycol ether or mixture thereof.

16. The logging medium of claim 14 wherein the polar organic solvent is selected from ethylene glycol, diethylene glycol, triethylene glycol, propylene glycol, butylene glycol, polyethylene glycol, polypropylene glycol, polyethylenepropylene glycol propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether, heptapropylene glycol n-butyl ether, the analogous tert-butyl ethers and combinations thereof.

17. The logging medium of claim 15 wherein said oleaginous fluid comprises a component selected from diesel, mineral oil, synthetic oil, vegetable oil, silicone oil, or combinations thereof.

18. The logging medium of claim 14 wherein said logging medium is the external phase of an invert emulsion drilling fluid.

19. The logging medium of claim 14 wherein the electrolytic salt is a quatemary amine salt having the formula:

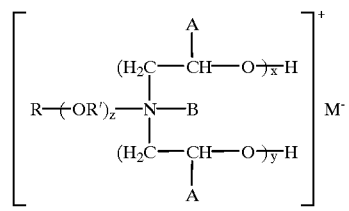

wherein R is an alkyl having 8 to 18 carbon atoms, R' is 2 to 6 carbon atoms alkyl group, B is hydrogen, oxyalkyl having 1 to 4 carbon atoms or alkyl having 1 to 4 carbon atoms, A is hydrogen or alkyl with 1 to 4 carbon atoms, x+y=1 to 15, z is 0 to 3, and $M^-$ is a counter anion; or combinations thereof.

20. The logging medium of claim 14 wherein the electrolytic salt is a quaternary amine salt having the formula:

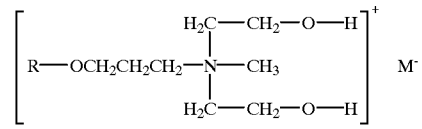

wherein M is any suitable anion, preferably halogen, and R being an alkyl have from 10 to 14 carbon atoms.

21. The logging medium of claim 14 wherein the electrolytic salt is isotridecyloxypropyldihydroxyethylmethylammonium chloride.

22. The logging medium of claim 14 wherein the logging medium further comprises a gelling agent is selected from clays, organophilic clays, polymers, polyamides, polymer emulsions or combinations thereof.

23. The logging medium of claim 14 wherein the logging medium further comprises a weight material is selected from hematite, magnetite, iron oxides, illmenite, barite, siderite, celestite, dolomite, calcite, manganese oxides, halites or combinations thereof.

24. The logging medium of claim 14 wherein said logging medium further comprises corrosion inhibitor selected from phosphates, silicates, borates, zinc compounds, organic amines, benzoic acid, and benzoic acid derivatives, phosphate esters, heterocyclic nitrogen and sulfur compounds, organic acids or combinations thereof.

25. The logging medium of claim 14 further comprising surfactant, emulsifier, wetting agent, fluid loss control agent and combinations thereof.

* * * * *

UNITED STATES PATENT AND TRADEMARK OFFICE
CERTIFICATE OF CORRECTION

PATENT NO.      : 6,308,788 B1
DATED           : October 30, 2001
INVENTOR(S)     : Arvind D. Patel, Reginald J. Bell and Burhan Hoxha It is certified that error appears in the above-identified patent and that said Letters Patent is hereby corrected as shown below:

<u>Title page,</u>
Item [75], Inventors, delete "Rejinald" and insert -- Reginald --

<u>Column 8,</u>
Line 18, delete "VG-699™" and insert -- VG-69™ --

<u>Column 21,</u>
Line 36, delete the numbers "9, 8 and 16" and insert the numbers -- 11, 9, 10, 8 and 16 --

<u>Column 27,</u>
Line 42, delete "ether" and insert -- further --

Signed and Sealed this

Fourth Day of June, 2002

*Attest:*

*Attesting Officer*

JAMES E. ROGAN
*Director of the United States Patent and Trademark Office*